United States Patent [19]
Bhagat et al.

[11] Patent Number: 5,740,239
[45] Date of Patent: Apr. 14, 1998

[54] METHOD AND APPARATUS USING BIT MAPS TO ACCESS DATA FOR PROCESSING TELEPHONE CALLS

[75] Inventors: Promod Kumar Bhagat, Morganville, N.J.; Dana Lee Garoutte, Wheaton, Ill.

[73] Assignee: Lucent Technologies Inc., Murray Hill, N.J.

[21] Appl. No.: 534,534

[22] Filed: Sep. 27, 1995

[51] Int. Cl.$^6$ .................................................. H04M 3/00
[52] U.S. Cl. .......................... 379/243; 379/201; 379/207; 379/220
[58] Field of Search ........................... 379/201, 207, 379/219, 220, 221, 242, 211, 212, 243

[56] References Cited

U.S. PATENT DOCUMENTS

| | | | |
|---|---|---|---|
| 5,155,858 | 10/1992 | DeBruler et al. | 395/800 |
| 5,473,681 | 12/1995 | Partridge, III | 379/221 |
| 5,475,749 | 12/1995 | Akinpelu et al. | 379/221 |
| 5,481,603 | 1/1996 | Gutierrez et al. | 379/221 |
| 5,509,058 | 4/1996 | Sestak et al. | 379/242 |
| 5,550,912 | 8/1996 | Akinpelu et al. | 379/201 |
| 5,559,877 | 9/1996 | Ash et al. | 379/219 |
| 5,598,464 | 1/1997 | Hess et al. | 379/219 |
| 5,636,261 | 6/1997 | Fils | 379/219 |

OTHER PUBLICATIONS

Sonnenberg et al., "Siemens Stromberg–Carlson's Contribution to MCI Metro's Local Number Portability Architecture Task Force Team," pp. 1–13 and attachments 1 and 2, Feb. 1995.

"Local Number Portability –MCI Metro Outline," BNR, MCI, Northern Telecom, Slides 1–24, Dec. 1994.

*Primary Examiner*—Krista Zele
*Assistant Examiner*—Scott Wolinsky

[57] ABSTRACT

In a telecommunications network, a method and apparatus for decreasing access time of information normally stored in a data base, shared by a plurality of switching systems usually remote from all or most of the systems. One or more bit maps are used to store key indicators for each telephone number for which information may be required. In one specific embodiment, a bit map indicates whether the information is stored locally in the switch, so that an access to the remote database is not required. In another embodiment, a bit map stores an indication of whether the desired information is a default attribute, or one of a plurality of common attributes of the information being sought. Advantageously, the number of data accesses required of the remote data base is sharply reduced, thus reducing the average call set up time.

28 Claims, 14 Drawing Sheets

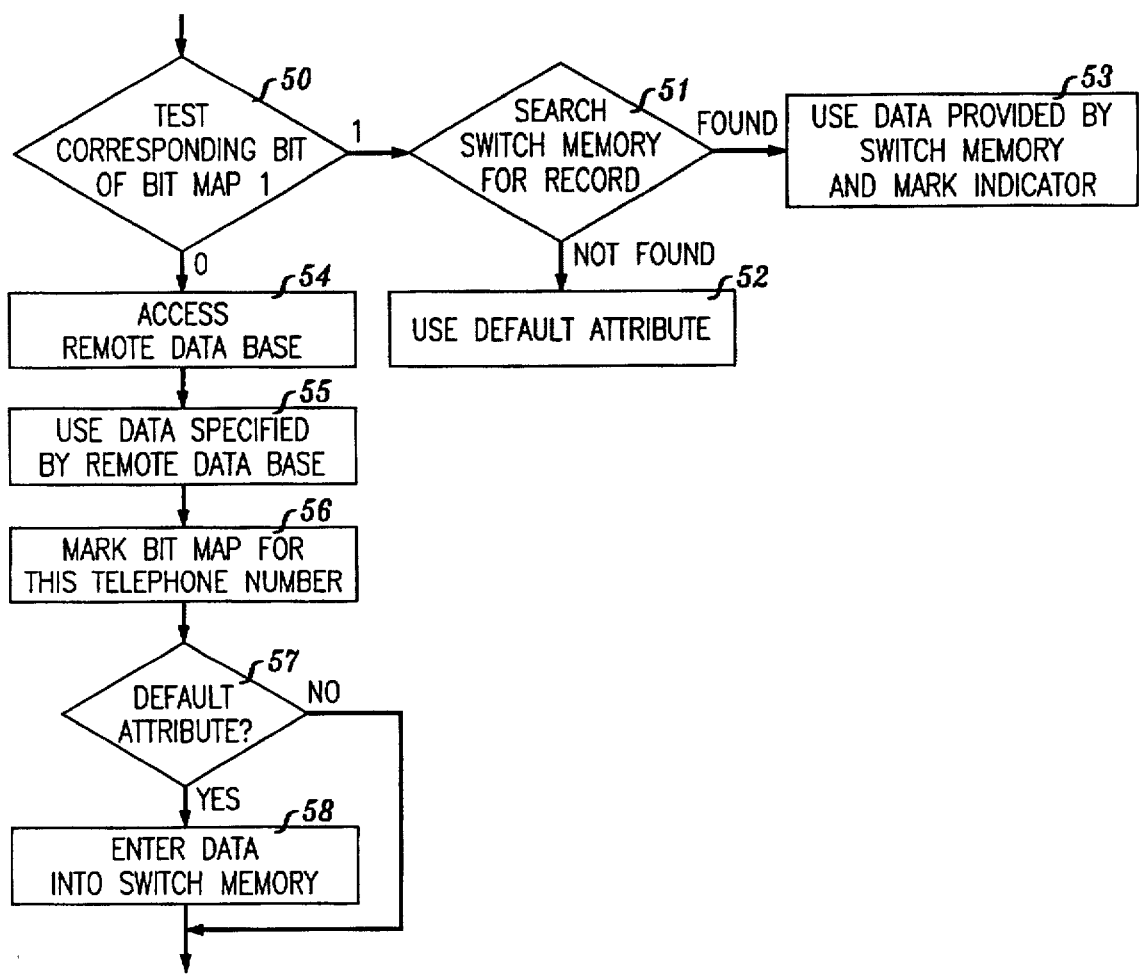

METHOD AND APPARATUS USING BIT MAPS TO ACCESS DATA FOR PROCESSING TELEPHONE CALLS

TECHNICAL FIELD

This invention relates to methods and apparatus for accessing data in telecommunications networks and specifically for accessing data in connection with the establishment of telecommunications calls.

PROBLEM

Modern telecommunications networks are increasingly using the concept of an intelligent network, i.e., a network which derives routing data or derives data for otherwise treating telecommunication calls from a data base shared by a plurality of switching systems. An example of such an intelligent network is the network used for carrying 800 calls. These calls, which are free to callers, are characterized by having a telephone number which is not directly related to the location of the called number. This is in contrast to normal telephone numbers wherein a three digit area code provides information as to the area to which a call is to be routed, a three digit office code usually provides information as to which central office in that area is to receive the call, and a four digit directory number identifies a particular called customer within that office code. In contrast, any 800 number (i.e. a number whose first 3 digits are 800), whose next three digits are NXX, (wherein N is a number between 2 and 9 and X is a number between 0 and 9), followed by a four-digit XXXX number, has no geographic significance. When a telecommunications network receives a call wherein the caller dials an 800 number, the network querys a data base. A data base translates the 800 number into a so-called POTS number (POTS=plain old telephone service) which later can be used in the conventional manner to route calls to a destination. The advantage of using an 800 number as opposed to simply using the POTS number is that the caller is immediately assured that there will be no charge for the call, a major consideration in soliciting business such as the ordering of merchandise or the reservation of an airline ticket or hotel accommodations.

The approach of using a data base to determine routing information is also being considered in connection with service provider number portability, i.e., the ability of a customer to retain a telephone number even when the customer is served by a different carrier using a different switching system. For this application the data base is accessed prior to routing calls to office codes whose telephone numbers are served from different switching systems belonging to different carriers.

A problem of the prior art is that the access time for querying a data base in order to obtain the information required for routing a call is substantial, currently approximately 300 milliseconds. This access time is directly added to the call setup time of telephone calls and noticeably slows down the completion of such calls. The use of common channel signaling which has become the prevalent and dominant mode in many areas has flowed the call set up time to be reduced to a small fraction of a second under normal circumstances in which no data base query is required. For the case of calls such as "800" (free) telephone calls, this is especially important since a data base query is required for the 800 number, and the time of an additional query should be added to the call set-up time.

SOLUTION

In accordance with applicant's invention the local data contained within a switching system provides information as to whether or not a remote data base query is required in order to establish a call to a particular telephone number. In accordance with one specific implementation, the data for indicating whether or not a data base query is required, is maintained in a bit map using one bit per called directory number served directly or indirectly from the querying switch.

In accordance with one specific implementation, if it is determined that no remote data query is necessary this may be because of one of two factors, either that the query response is a default response or that the query response has been stored in memory at the querying switch. One example of a default response is the identification of a dominant carrier in a situation in which the data base query is used to find the identity of the carrier for serving a terminating call. In accordance with one feature of applicant's invention, the distinction between the default attribute and an entry in the data retained in the querying switching system is provided by a second bit map. Advantageously, the use of the second bit map eliminates a search of the data maintained in the querying switching system.

In one specific embodiment of applicant's invention, the data base is used for routing calls in a number portability environment wherein the area code plus office code does not always identify which switching system serves a called number. Under these circumstances a local universal data base (for processing calls within a local exchange area) or a national database (for processing interlocal area (toll) calls) may be used. In such a situation especially initially, a large fraction of the telephone numbers will continue to be served by a dominant local exchange carrier (such as one of the regional holding companies formed when AT&T divested itself of its local exchange carriers) so that the ability to identify called telephone numbers served by a dominant carrier will already reduce the call set-up time for a large fraction of calls. The call setup time for many if not most of the remaining calls is reduced by having a modest size memory for storing the data for the most frequently called telephone number requiring an attribute other than the default attribute.

In accordance with applicant's invention the centralized data base remains the high reliability depository of the data that it contains. Periodically the data in the bit maps is cleared and the data for the most frequently called number is also cleared so that it can repopulate via access to the centralized data base as calls are made. This will automatically update the memory of the individual switching system.

BRIEF DESCRIPTION OF THE DRAWING

FIGS. 4–9 are flow diagrams of a method executed by the processor of the switch for implementing applicant's invention;

DETAILED DESCRIPTION

Figure 1:
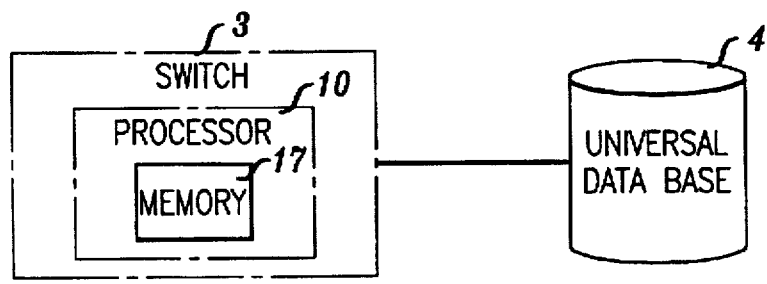
FIG. 1 is a block diagram showing a switching system (switch) connected to a data base shared by a plurality of such switching systems

FIG. 1 illustrates that a switch 3, comprising of processor 10 which in turn includes memory 17, accesses a universal data base 4 whenever its own memory 17 does not contain specialized data required for processing a call (such as the identification of a switch for serving the termination of a call identified by a received telephone telephone number). The call processing details for the specific case of number portability are described with respect to later figures.

Figure 2:
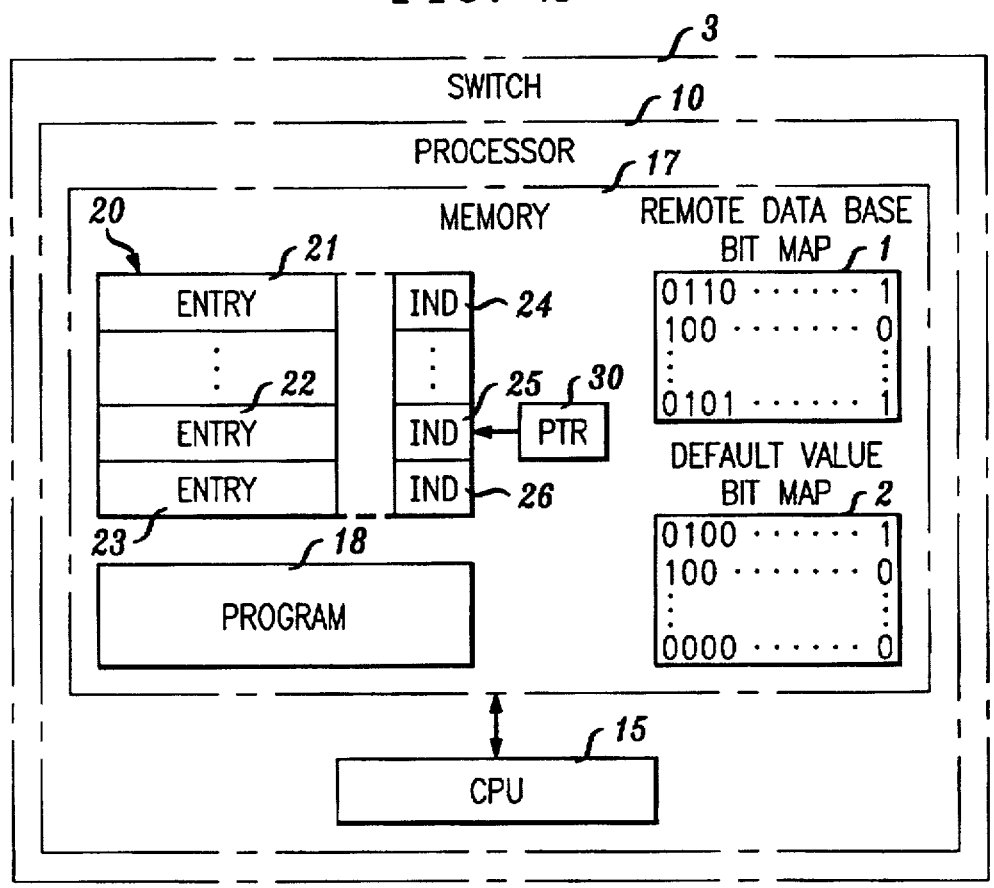
FIGS. 2 and 3 are memory layouts of data and the program stored in the memory of the switch.

FIG. 2 illustrates the memory content of the processor that is pertinent to the implementation of applicant's invention. Processor 10, controlled by central processing unit is operative under the control of a program 18 for performing the actions of the flow charts shown herinafter. Memory 17 includes two bit maps 1 and 2 each having one bit per called telephone number whose routing is to be determined by switch 3. In addition, memory 17 includes a table 20 comprising a plurality of entries 21 . . . 22, 23 each having a corresponding indicator, 24, . . . . 25, 26. A pointer 30, points to one of the entries and its corresponding indicator and is used to help remove one entry when another entry is to be inserted in the table. This action takes place if the universal data base 4 is accessed and the result is other than the default attribute; under these circumstances an entry in table 20 which has been used relatively infrequently is deleted, and the corresponding bit map indicator changed to indicate that the data for this terminating directory number is no longer stored in the switch. The newly acquired entry is then placed in the location in table 20 vacated by the removed entry. A well known data structure, the AVL tree, described for example in D. F. Stubbs et al.; Data Structures with Abstract Data Types and Pascal, Brooks COle Publishing Company, 1985, pp 225–234, is used to allow any entry to be placed anywhere in table 20 and to allow relatively rapid access to any such entry. Details of new entry insertion are described below with respect to FIG. 4.

Figure 3:
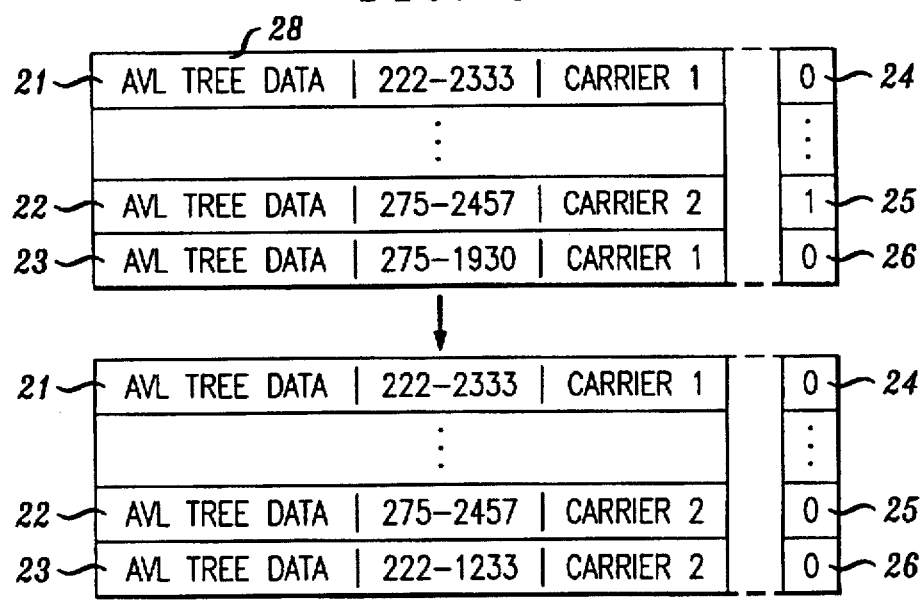

FIG. 3 shows two states of table 20. It is assumed in this case that switch 3 provided routing for calls to at least two office codes, namely 222 and 275. Entry 21 indicates that telephone number 222-2333 is served by carrier 1, that telephone number 275-2457 is served by carrier 2 and that telephone number 275-1930 is served by carrier 1. It is assumed in this case that all the telephone numbers served by switch 3 are in the same area code. Clearly if switch 3 is a toll switch, then a full 10-digit number would be required. The bottom portion of FIG. 3 then indicates that entry 23 has been deleted and data for telephone number 222-1233 served by carrier 2 has replaced the data in entry 23.

Figure 4:
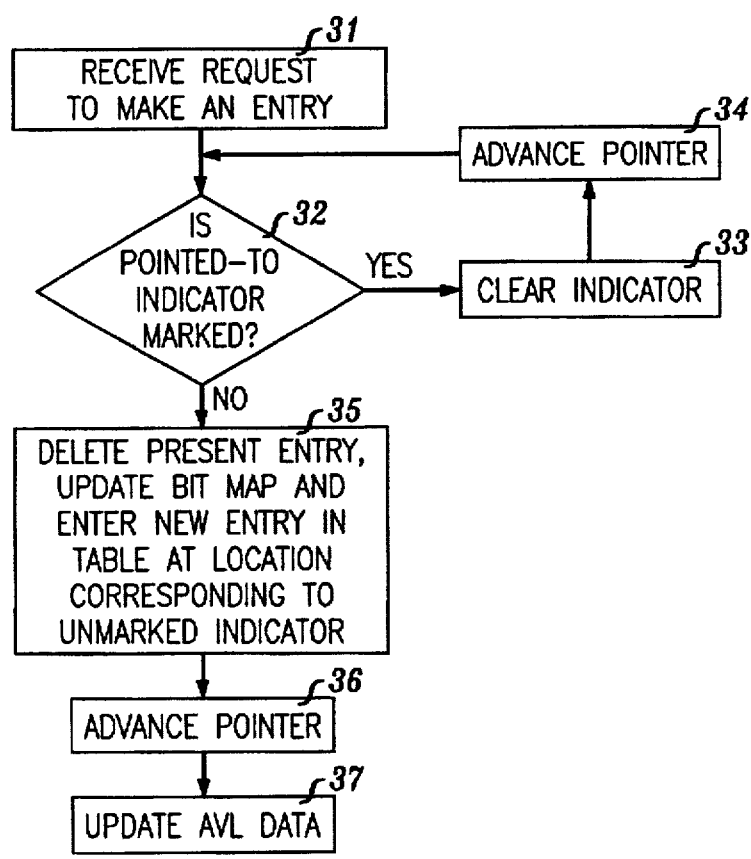

FIG. 4 illustrates the process of inserting an entry into table 20. Pointer 30 points one beyond the last place where an entry had been inserted into table 20. A request is received to make an entry into table 20 (action block 31). Test 32 is used to determine whether the pointed to indicator is marked. If it is, then that indicator is cleared (action block 33), the pointer is advanced (action block 34), and test 32 is repeated. If the result of test 32 is that the pointed to indicator is not marked, then the present entry is deleted, the bit maps for that entry are updated to indicate that data for the number corresponding to the present entry must now be accessed from the data base, and the new entry is entered at the location corresponding to the unmarked indicator found in the last iteration of test 32 (action block 35). The bit pointer is advanced (action block 36) and the AVL data to link the entries in the table in such a manner that any particular entry can be found rapidly is updated (action block 37). The bit maps 1 and 2 must be updated as described hereinafter with respect to FIGS. 6 and 7.

FIG. 5 illustrates that the contents of table 20 are periodically refreshed by simply clearing all entries in the table and clearing all indicators in the table (action block 40).

Entries in the table are cleared by clearing the AVL tree data and by updating the bit maps 1 and 2 to indicate that nothing is known in the local data about any of the telephone numbers routed from switch 3. Periodically may mean every night at midnight or 2 a.m.; thereafter the first instance of any telephone number requires an access of the remote data base 4. Then, calls as they come, populate table 20, and populate the bit maps 1 and 2 for indicating that a particular directory number has the default value, i.e., in this case, is served by the dominant carrier, or to indicate that table 20 contains data for a particular telephone number. At the same time as table 20 is cleared, both bit maps are cleared which means that the remote data base will be consulted for the next call for every number routed from switch 3. To clear data from table 20, the AVL tree data is cleared so that no entry is found in the search. The AVL tree data is cleared in such a way that subsequent attempts to enter data into table 20 are successful. The purpose of the actions described in FIG. 5 is to allow the data in the bit maps and the table to be periodically refreshed from the contents of universal data base 4.

Figure 7:
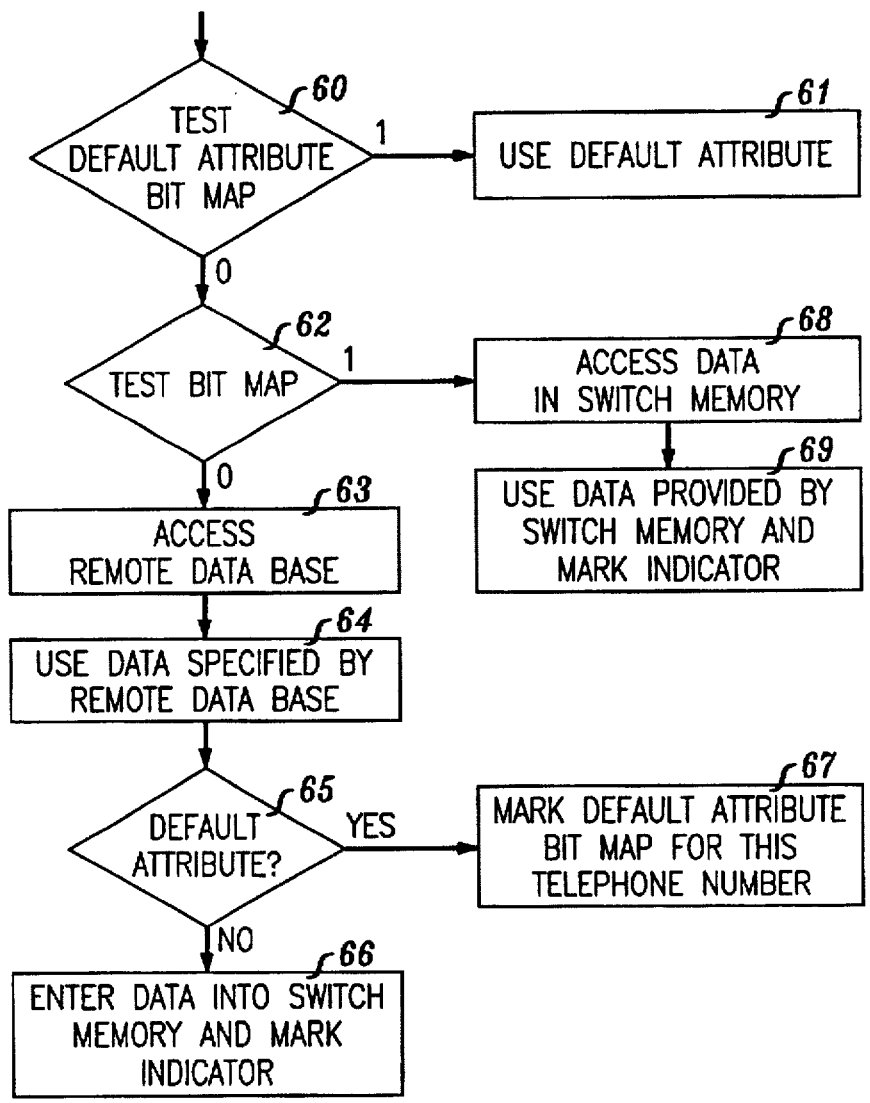

FIGS. 6 and 7 illustrate alternate processes for accessing data in either of the switch or the remote data base. FIG. 6 illustrates the case in which only a single bit map (bit map 1) is stored in the switch; the bit indicates whether the required data is stored in the switch (bit=1) or whether the access of the remote data base is required. Test 50 tests the state of the bit map 1 that corresponds to the directory number for which the data is being sought. If this bit is 1, then the required data may be obtained within the switch memory. Test 51 searches the switch memory for such data. If the data is not found, then the default attribute is used, (action block 52). If the data is found, then the data provided by the switch memory is used, and the indicator in table 20 for that data is marked (action block 53). Marking the indicator ensures that this table entry is not an immediate candidate for being deleted from the switch memory in the sequence of FIG. 4. If the result of test 50 is that the bit is zero, then the remote data base is accessed (action block 54). The data specified by the remote data base is then used (action block 55). The bit map for the telephone number for which a query has been made is marked in preparation for indicating that the default attribute is applied to this number or that the appropriate data is stored in switch memory (action block 56). Test 57 determines whether the data found is the default attribute. If so, no further processing action is required; if not, the data found in the remote data base is entered into switch memory (action block 58), and the indicator for this data entry is marked to 1 to ensure that it is not an immediate candidate for removal.

FIG. 7 illustrates the case in which 2 bit maps are used. The advantage of using 2 bit maps is that it saves the time required to search table 20 or any equivalent thereof in order to determine whether the data associated with the telephone number to which the data request has been made is the default attribute (in which case no data entry is stored). The disadvantage is the cost of storage of the second bit map.

When a data access is required, the default attribute bit map, (bit map 2) is tested (test 60). If the result of this test is a 1, then the default attribute is used (action block 61). The advantage of the arrangement of FIG. 7 is that since the most frequently used instance of the data, namely the default attribute, is found very quickly. If the result of test 60 is that the bit corresponding to the telephone number for which data is being sought is a zero, then a second bit map which corresponds to bit map 1 of FIG. 2 is tested (test 62) to determine whether the required data is to be found in the memory of the switch or is to be found in the remote data base. If the value of the bit is zero, then the remote data base is accessed (action block 63) and the data specified by the remote data base is used (action block 64). Test 65 is used to determine whether the data found from the remote data base is the default attribute. If not, then the data is entered into switch memory and the indicator for that data entry is set to 1 (action block 66). If the data returned by the remote data base is the default attribute, and it is possible that the remote data base instead of returning a default attribute simply returns a no data found message which is interpreted by switch 3 as representing the default attribute, then the default attribute bit map (bit map 2) for this telephone number is marked (action block 67), and the default attribute is used.

If test 62 indicated that the bit is 1 i.e. that the data is to be found in switch memory, then switch memory is accessed to find this data (action block 68). The data provided by the switch memory is used and the indicator for that data entry is marked in order to ensure that this data entry is not an immediate candidate for deletion (action block 69).

A third possibility, common attribute bit maps instead of one default attribute bit map, is that only a default attribute bit map is used and that data such as that stored in table 20 is not kept in the switch. For this situation, the switch accesses the remote data base for all telephone numbers for which a default attribute has not yet been confirmed by the remote data base. In alternative, or for the case described with respect to FIG. 7, it is also possible to have several bit maps corresponding to several common attributes (frequently used attributes) which in this case would be the several most common instances of the requested data. In the case of the number portability application this would be for the dominant carrier and several most frequently used alternate carriers.

Figure 8:
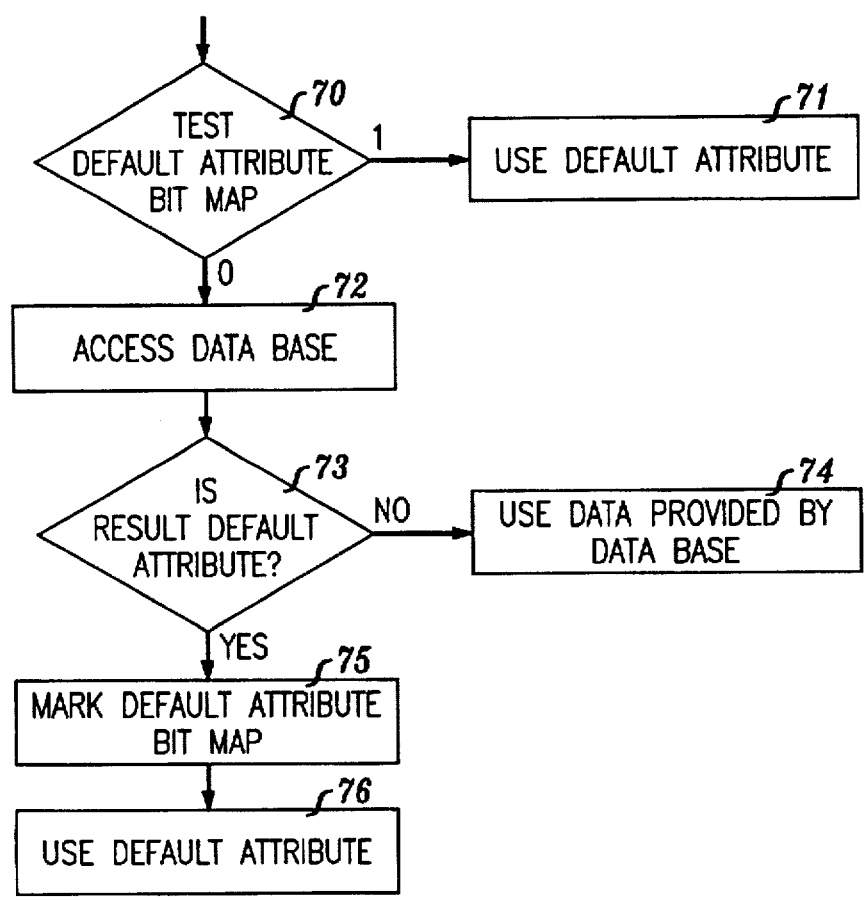

FIG. 8 is a flow diagram illustrating the use of the default attribute bit map only. The default attribute bit map is accessed using the telephone number for which data is required. If the result of test 70 is that a 1 was found in the bit map then the default attribute is used (action block 71). If the result of test 70 is that a 0 was found, then the data base is accessed (action block 72). Test 73 tests the result of the data base access to determine whether it is the default attribute. If not, the data found in the data base is used (action block 74) If the result is a default attribute, then the default attribute bit map is marked (action block 75) and the default attribute is used (action block 76).

Figure 9:
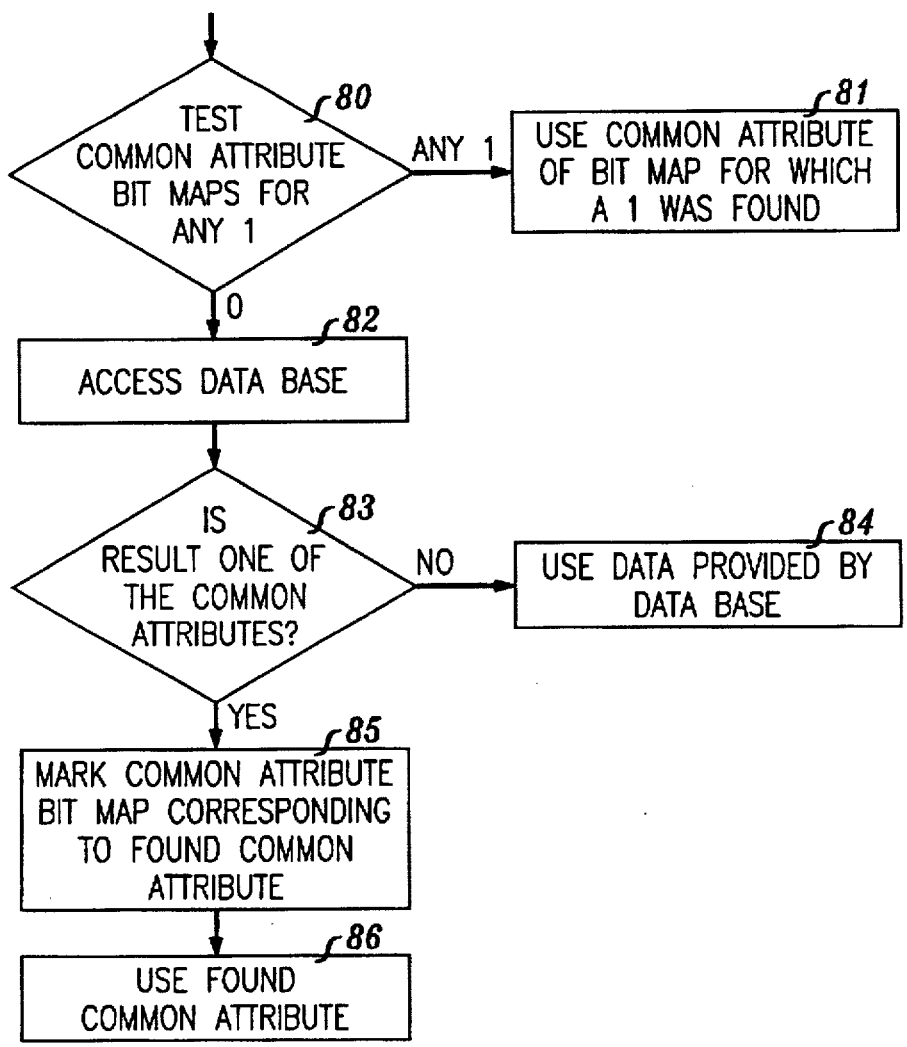

FIG. 9 considers the case in which there is not a single default attribute map, but a plurality of common attribute maps. Each of the common attribute maps is tested to determine whether the bit corresponding to the telephone number is 1 in any of these bit maps (action block 80). If so then the common attribute of the bit map for which a 1 was found is used (action block 81). If all zeros are found then the data base is accessed (action block 82). Test 83 then determines whether the result found in the data base is one of the common attributes, if not then the data provided by the data base is used (action block 84). If the result is one of the common attributes, then the common attribute bit map corresponding to the found common attribute is marked (action block 85) and that found common attribute is used as the data (action block 86).

For both the cases described in FIG. 8 and FIG. 9 in order to maintain the integrity of the data base, it is simply required to clear the default attribute bit map (FIG. 8) or all of the common attribute bit maps (FIG. 9) and to repopulate these bit maps as telephone calls are made.

FIGS. 10–18 illustrate a specific system arrangement in which the principles of applicants invention as described with respect to FIGS. 1–9 can be applied in one preferred embodiment. The teachings of the present invention are used to implement action blocks 309, 401, 505, and 603 of FIGS. 12, 13, 14, and 15. Where alternate carriers are specified for a telephone number, an entry in table 20 or in the remote data base is required unless it is decided that a "default" attribute should be reserved for a very frequently used pairing of preferred and alternate carrier, and multiple "default" attribute bit maps are used.

Figure 10:
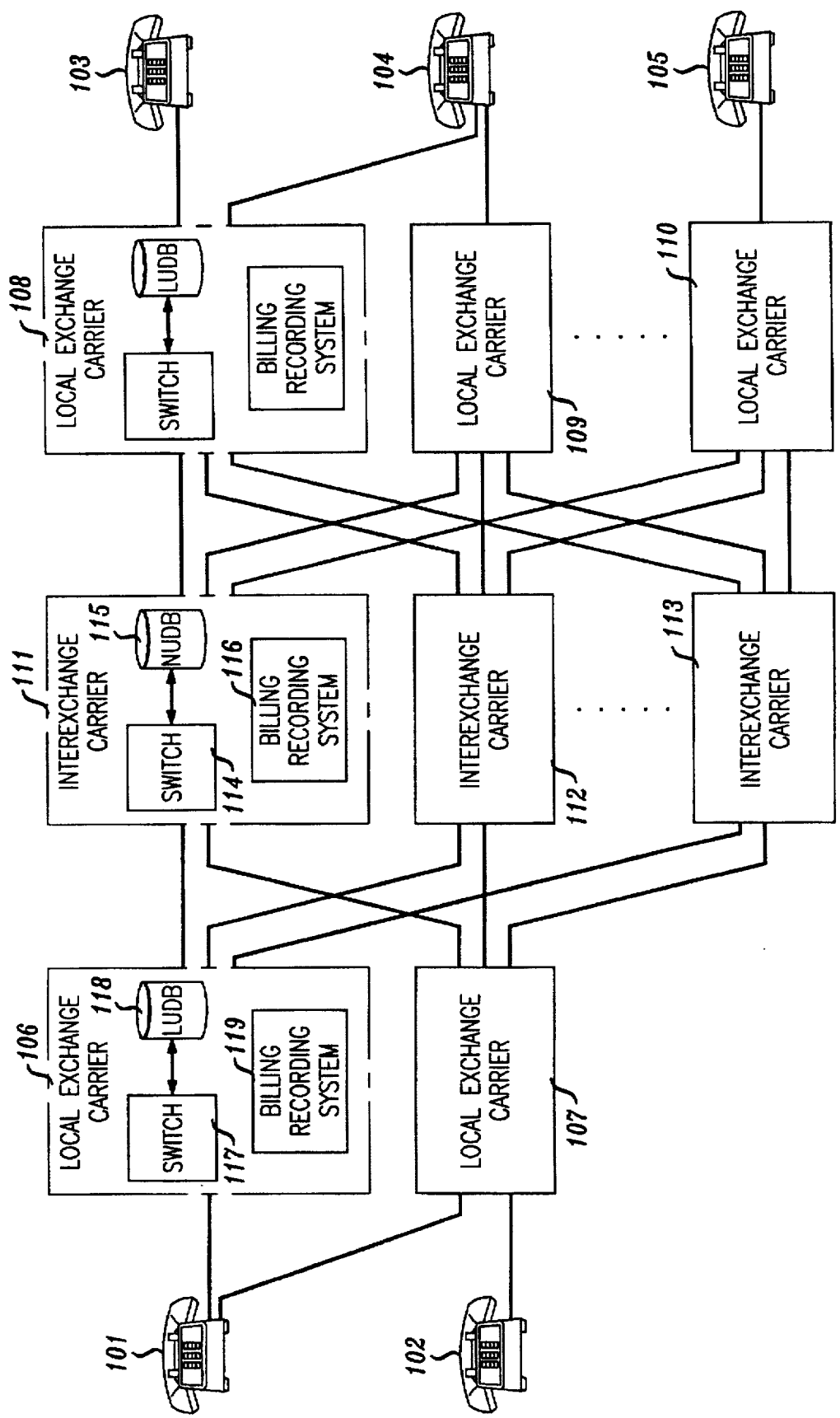
FIGS. 10 and 11 are block diagrams of a specific application of applicant's invention.

FIG. 10 is a block diagram showing the relationship between telephone customers, local service providers (i.e., local exchange carriers) and interexchange carriers. Individual customers 101–105 serve to originate or terminate telephone traffic. Some of these customers, such as customers 101 and 104, are connected to two carriers in order to provide especially reliable service. Local exchange carriers 106–110 are connected to the customers and are connected to interexchange carriers 111–113. Each local exchange carrier includes one or more switches 117, a local universal data base (LUDB) 118 and a billing recording system 119. Alternatively, a local universal data base can be shared by several or all local carriers. The switches are for establishing telephone connections in the conventional way and are interconnected by the links shown in FIG. 10. The data base 118 need only contain data for the telephone numbers of the region served by the local exchange carrier. Each of the local exchange carriers serving a particular region stores in its data base data concerning all the numbers of the region so that in a broad sense, each of the data bases contain the same data. The data base for a particular region and a particular carrier is accessed through data links from each of the switches of the carrier serving that region. While FIG. 10 shows individual data bases for each local exchange carrier, these data bases could be shared among a plurality of such local exchange carriers; this is particularly straightforward since the data bases are accessed using data links.

The local exchange carriers are connected to interexchange carriers 111 112 . . . , 113, each of which contains one or more switches 114, and access to a national universal data base (NUDB) 115 and a billing record system 116. The remarks made previously about the local data base are also applied to the national database which, of course, is very much larger. This national data base can be concentrated or distributed and can be shared among a plurality of interexchange carriers since it is accessed by data links from the switches that use the data of the data base.

Figure 11:
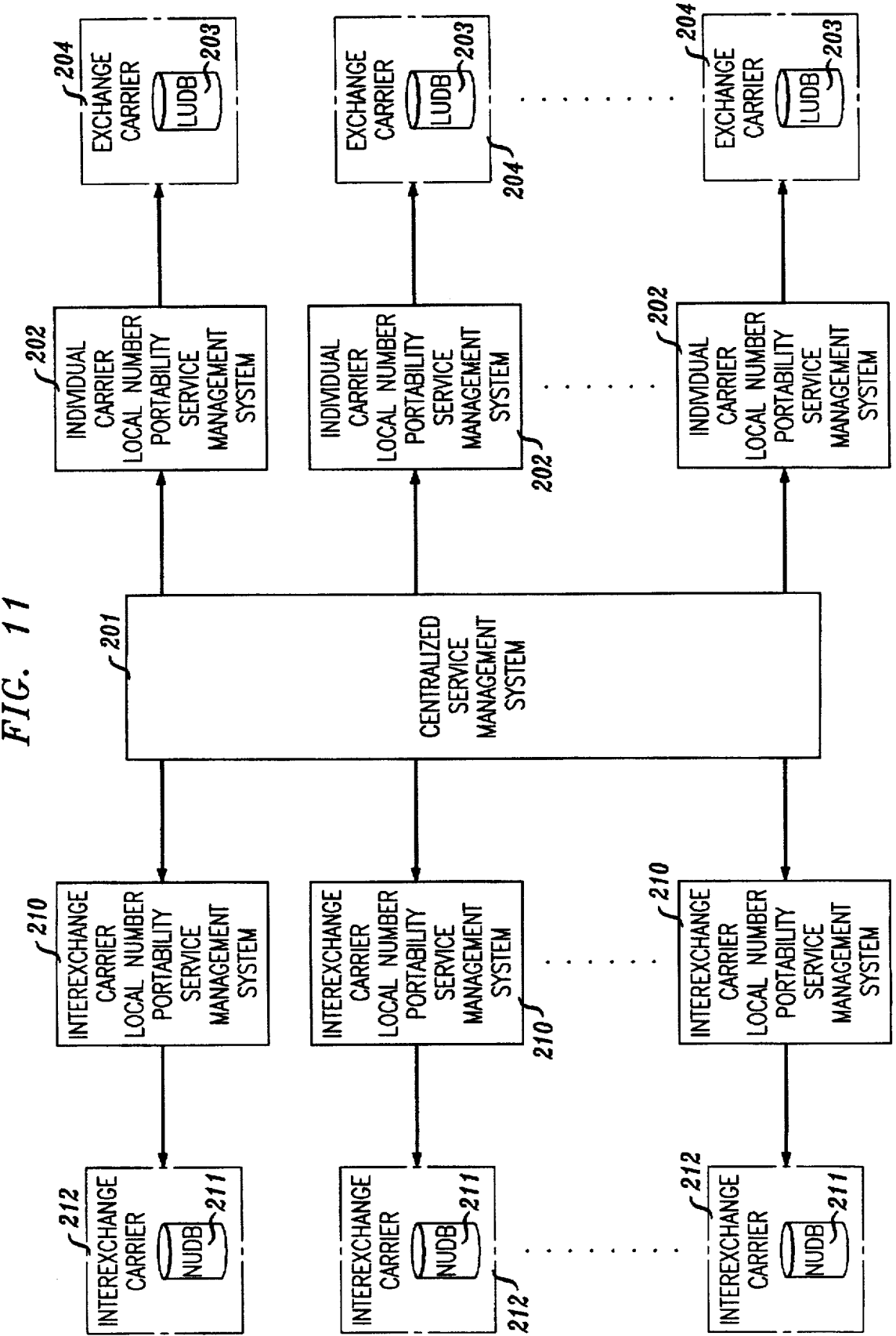

FIG. 11 shows an arrangement for updating the local and national data bases. A centralized service management system 201 transmits update messages to individual carrier local number portability service management systems 202 which transmit update messages to the local data bases 203 of each of the carriers 204. Similarly, the centralized service management system 201 transmits data messages to interexchange carrier local number portability service management systems 210, each of which are used to update the national data bases 211 of each of the carriers 212.

Local access providers must provide update information to the centralized service management system 201. The customer's new local service provider is responsible for the update for the case in which the customer changes service providers. When a customer switches carriers, the original local carrier may be required to forward calls for a short period (a few days) until the data base has been updated.

Figure 12:
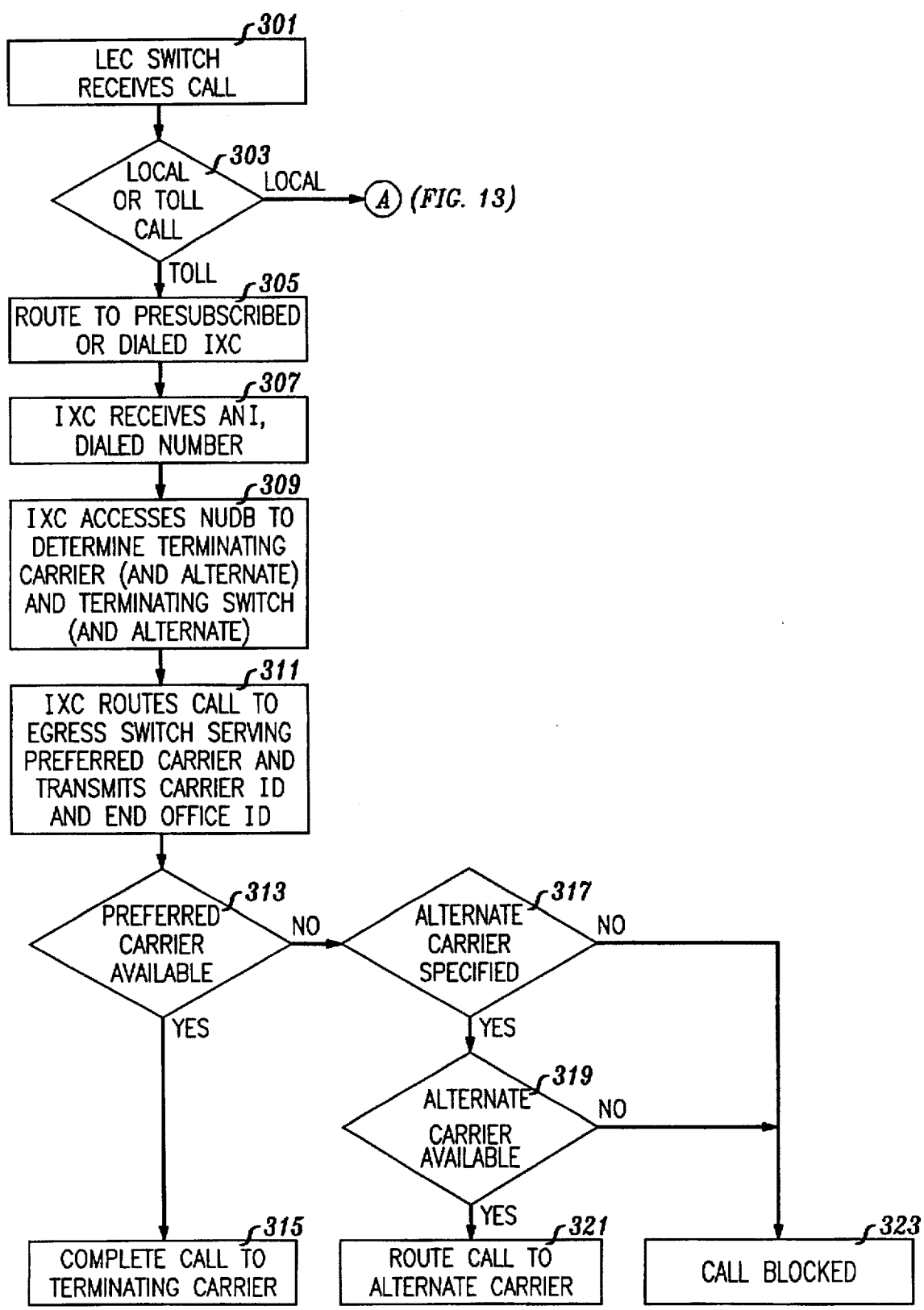
FIGS. 12–15 are flow diagrams of the application of FIGS. 10 and 11.
Figure 13:
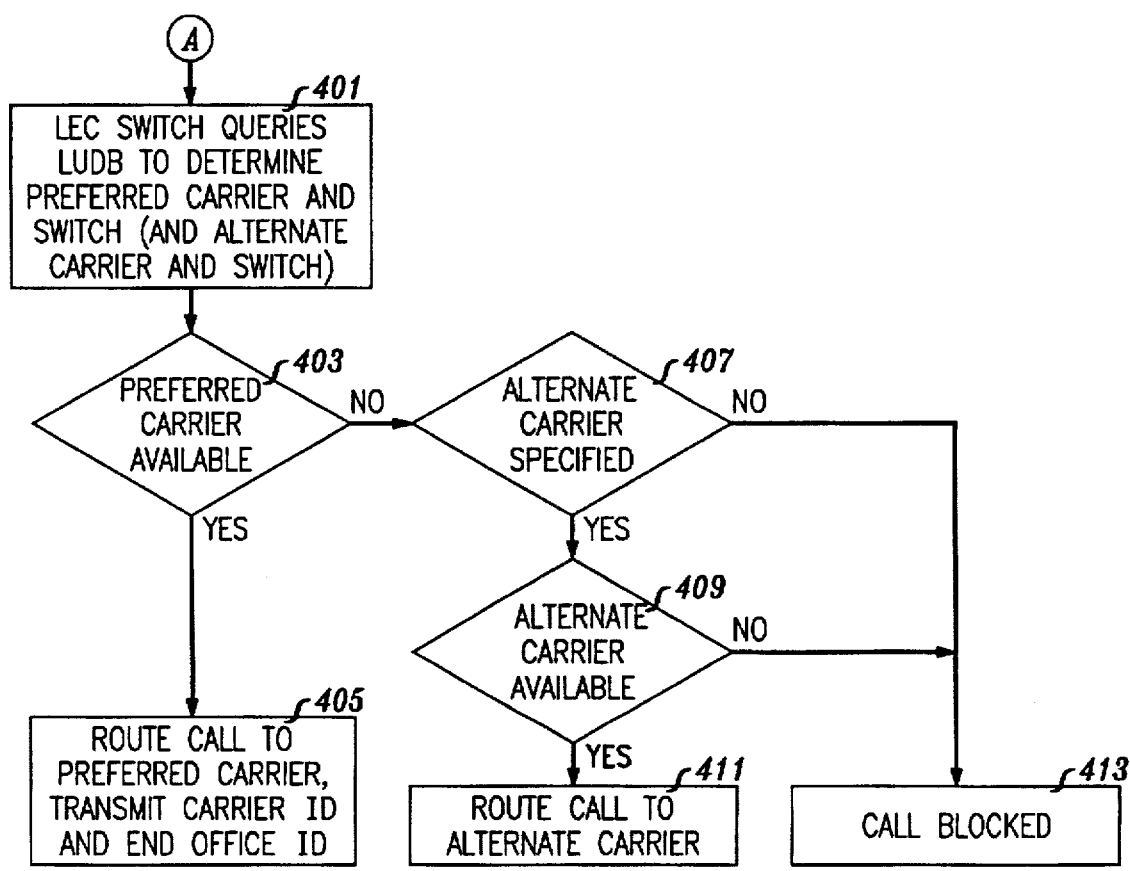

FIG. 12 is a flowchart of the routing procedure for this kind of arrangement. The local exchange carrier switch receives the call (action block 301). The local carrier switch makes a translation whether this is a local or a toll call (test 303). If geographic number (location) portability has been implemented in the region where the call is received, then in order to successfully complete test 303, the local data base will return the preferred terminating local exchange carrier and the switch from which the terminating customer is served and this can be used in conjunction with the identification of the originating switch to determine whether this is a local or toll call. A call will also be a toll call if it is recognized that the local data base will not contain data for that terminating customer. This can be determined, for example, from the NPA code of the terminating customer, or if geographic number (location) portability has not been implemented from the office code of the called number. If as a result of test 303 it is determined that this is a toll call, then the call is routed to the pre-subscribed interexchange carrier or if the customer specifies an interexchange carrier by dialing an appropriate code, then to the specified dialed interexchange carrier (see action block 305). The interexchange carrier receives the Automatic Number Identification (ANI) of the calling customer, and the Dialed Number (action block 307). The interexchange carrier then accesses the national data base to determine the terminating carrier (and alternate where provided) and the terminating switch (and alternate where specified) (action block 309). The interexchange carrier then routes the call to an egress switch serving the preferred terminating carrier and transmits the terminating carrier and local office identification (action block 311). Test 313 determines whether the preferred carrier is available; if so, the call is completed to the called customer via that terminating carrier (action block 315). If the preferred carrier is not available (negative result of test 313), then test 317 determines whether an alternate carrier has been specified. If so, then test 319 determines whether the alternate carrier is available. If so, the call is routed to the alternate carrier for completion to the called customer (action block 321). If the alternate carrier is unavailable, then the call is blocked and given blocked call treatment (action block 323). Similarly, if no alternate carrier had been specified (negative result of test 317) then the call is also blocked (action block 323).

If the result of test 303 for determining whether this is a local or toll call is that the call is a local call, then action block 401 (FIG. 13) is entered. In action block 401 the local exchange .carrier switch queries the local data base to determine the preferred carrier and switch (and alternate carrier and switch if so specified). Test 403 is used to determine whether the preferred carrier is available. If so, then the call is routed to the preferred carrier, and the terminating carrier and end office identification are transmitted toward the terminating carrier (action block 405). If not, test 407 determines whether an alternate carrier has been specified. If so, test 409 determines whether the alternate carrier is available. If so, then the call is routed to the alternate carrier for completion to the called customer. If the alternate carrier is not available (negative result of test 409) or if no alternate carrier had been specified (negative result of test 407) then the call is given blocked call treatment (action block 413).

Figure 14:
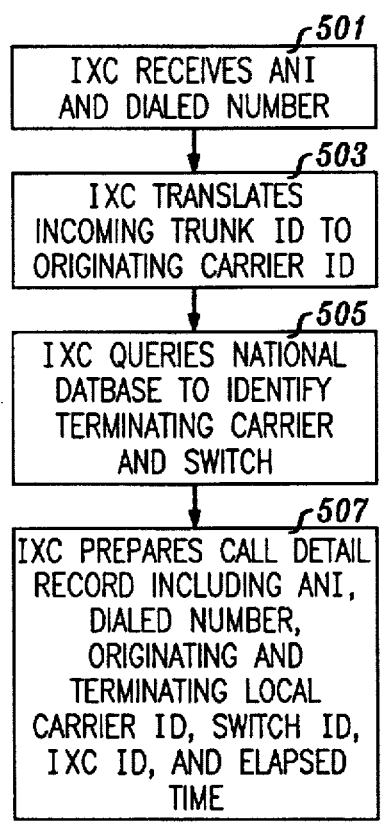

FIG. 14 is a flow diagram showing the actions performed for billing a toll call. The interexchange carrier receives the ANI and Dialed Number (action block 501). The interexchange carrier translates the incoming trunk identification to identify the originating carrier (action block 503). Alternatively, signaling information from the originating carrier can identify that carrier. The interexchange carrier then queries the national data base to identify the terminating carrier and switch for the called number (action block 505) and the interexchange carrier prepares a call detail record including the ANI, Dialed Number, originating and terminating local carrier identification and switch identification, the interexchange carrier identity (in case billing records are processed for several carriers by a single processor), and elapsed time for the call (action block 507).

Figure 15:
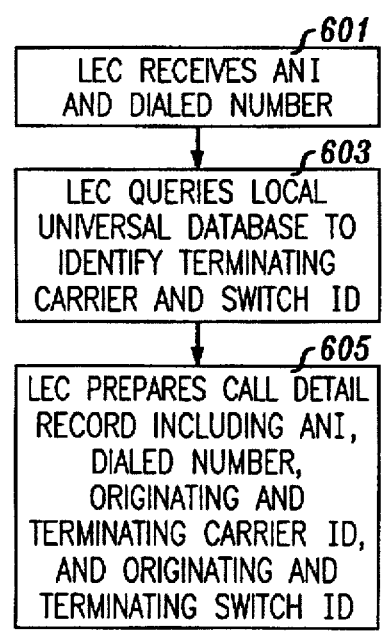

FIG. 15 is the billing procedure for local calls. The local carrier receives the Dialed Number and the ANI of the originating customer (action block 601). The local carrier then queries the local data base to identify the terminating carrier and switch based on the Dialed Number (action block 603). The local carrier then prepares a call detail record including the ANI, Dialed Number, the terminating carrier and terminating switch identification (action block 605).

For the case that the alternate terminating carrier is used, the alternate terminating carrier and switch are substituted for the preferred carrier and switch in the call detail record.

Figure 16:
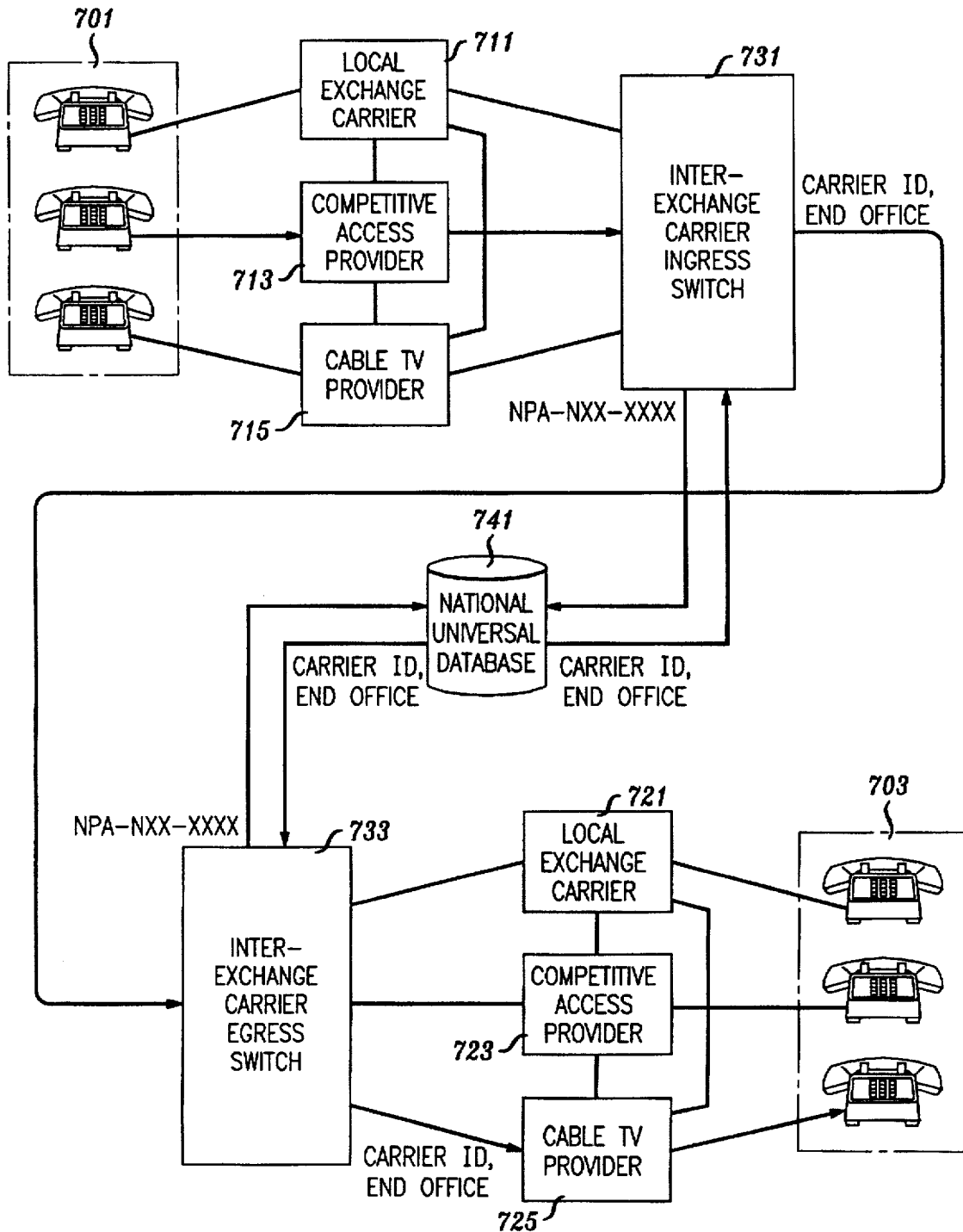
FIGS. 16–18 are further block diagrams illustrating the application.

FIG. 16 illustrates a toll call and illustrates some of the ways in which the arrangement described herein has flexibility. A customer 701 has access to three different local carriers: namely, Local Exchange Carrier 711, Competitive Access Provider 713 and Cable TV provider 715. Assume that this customer elects for a particular call to use the Competitive Access Provider 713. When the toll call arrives at the ingress switch 731 of the selected interexchange carrier, the call is routed to the egress switch of interexchange carrier 733, either the ingress switch or the egress switch may query a national universal data base 741 to obtain information as to the carrier and office serving the called customer. The interexchange carrier switch querying data base 741 supplies the called party number (NPA-NXX-XXXX) and receives in response the identity or identifies of the carrier(s) and end office(s) of the local carrier serving the called customer. It is also possible that the data base is queried from an intermediate switch of the selected interexchange carrier; this might happen, for example, if the call is of a special type handled by a specialist interexchange carrier switch. At any rate, the egress switch is informed, either by the querying switch, or directly by the data base if the egress switch is the querying switch, of the identity of the preferred carrier(s) and the identity of the end office for each such carrier. The call is then routed, in this case via CATV carrier 725, to the terminating customer. Note that in the terminating region there is also a Local Exchange Carrier 721 and the Competitive Access Provider 723, so that there is an alternative for completing the call to the called customer 703. In order to provide revenue to the carrier that actually processed the call, the identity of the originating and terminating local carrier, as well as the interexchange carrier, are provided either explicitly to the call detail records or implicitly because the record is made by a particular carrier.

Figure 17:
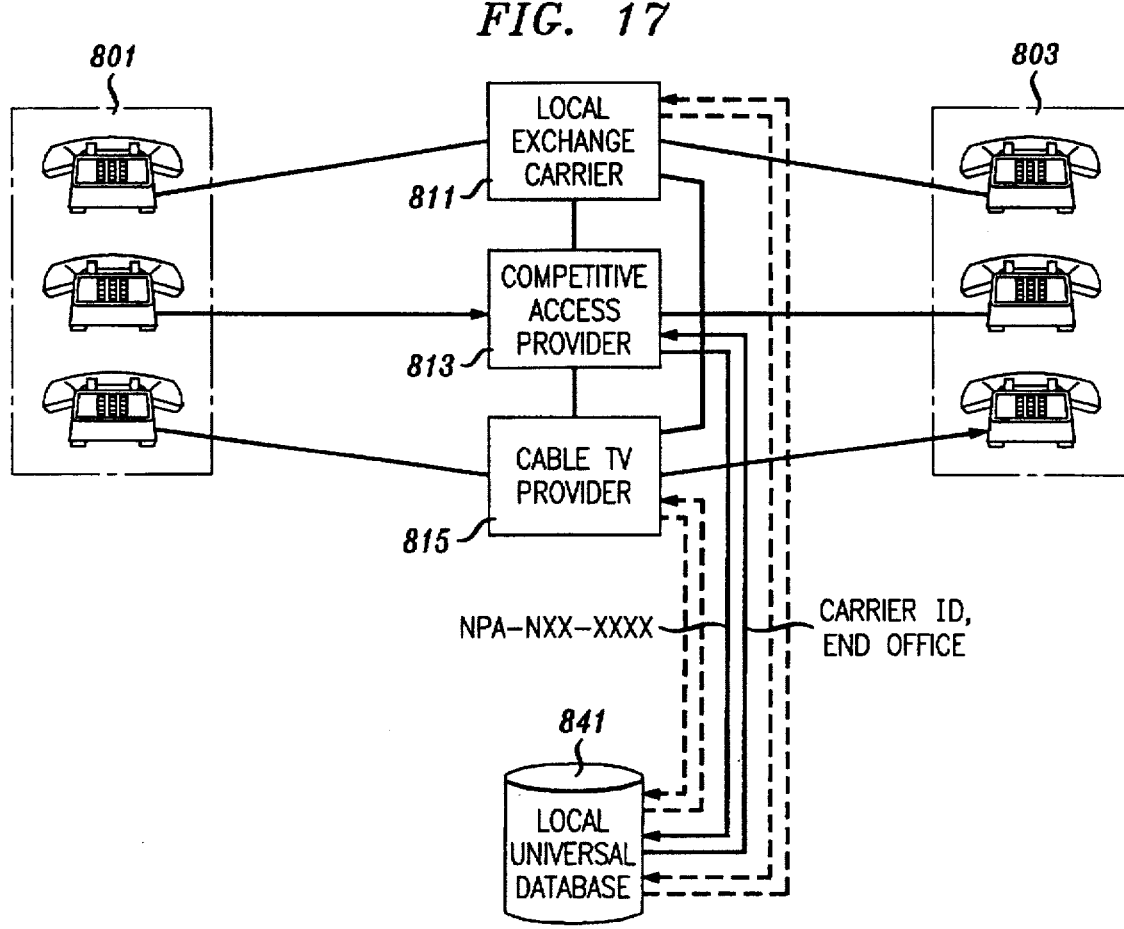

FIG. 17 illustrates a local call and illustrates some of the ways in which the arrangement described herein has flexibility. A customer 801 has access to three different local carriers, namely local exchange carrier 811, Competitive Access Provider 813 and Cable TV provider 815. Assume that this customer elects for a particular call to use the Competitive Access Provider 813. When the local call arrives at a switch at Competitive Access Provider 813, the switch from the Competitive Access Provider 813 accesses local universal data base 841 with the dialed number (NPA-NXX-XXXX) and receives in response the identity or identities of the carrier(s) and end office(s) of the local carrier serving the called customer. The Competitive Access Provider then routes the call via the preferred carrier which may be local exchange carrier 811 or Cable TV provider 815. Note that in the particular case where illustrated in the diagram wherein called customer 803 has access to all three carriers, the call can be routed via a non-preferred carrier if access via the preferred terminating carrier is blocked. In order to provide revenue to the carrier that actually processed the call, the identity of the originating and terminating local carrier are provided either explicitly to the call detail record or implicitly because the record is made by a particular carrier.

While in the preferred embodiment, the interexchange carrier accesses the national data base, the originating carrier can alternatively be arranged to access that data base and forward the identity of the terminating carrier(s) and switch (es) to the interexchange carrier.

For a local operator assistance call, the local carrier determines that the call is a local operator call and sends the call to a local operator assistance system which may be part of the calling party's local carrier network, or in another local network (operator systems can serve multiple local networks). The originating local carrier is identified to the operator system either by incoming trunk information or signaling. The operator system performs the requested operator service and then queries the LUDB to get the terminating carrier and terminating switch. It routes the call to the terminating carrier, passing the carrier and switch identification. The operator system makes a call detail record that includes both the originating and terminating, carrier and switch, identifications.

For a toll operator call, the local carrier determines that the call is a toll operator call and sends the call to the subscribed or dialed toll carrier operator system. The originating local carrier is identified to the toll operator assistance system either by incoming trunk information or signaling. The operator system performs the requested operator service and routes the call to a toll ingress switch. >From here, routing is the same as a toll call—the ingress toll switch queries the NUDB, etc. When the toll call is successfully routed, the terminating carrier and switch identifications are signaled in the backwards direction to the operator system to be included in the call detail record. Essential to the implementation of Local Number Portability (LNP) is the ability to associate a network destination with a ported dialed number. This information, identified as a Location Routing Number or LRN, will necessarily indicate the specific switching entity which serves the called party and, therefore, to which the call must be routed. Clearly, the LRN will be the key element in the LNP data base.

An LRN must be selected for each switching entity which terminates subscriber lines. Although LNP, and in particular, the use of an LRN will significantly impact call processing in all networks, the format of the LRN can be selected to minimize the required network changes. Specifically, it would be desirable if the use of the LRN:

allowed the continued use of current network routing methods permitted the use of existing signaling protocols avoided the need for new technical standards Any number of formats might be considered for use as an LRN. For example, a simple 5 digit numeric code would allow the unique identity of up to 100,000 end offices. Alternatively, the code could be designed to include routing information indicating, for example, a region of the country in which the end office was located; or the code could be designed to include the identity of the local service provider. All of these suggestions, however, fail to satisfy the most important of the above mentioned criteria—the need to retain the current routing algorithms in all network switches. Today, routing is based upon the geographic information contained in North American Numbering Plan (NANP) numbers—specifically the first six digits of those numbers or NPA-NXX. Accordingly, the use of an LRN in a format other than NPA-NXX would create the need to develop routing based upon the new code. It appears appropriate, therefore, that the LRN retain the format of the numbering plan used to identify end offices today; that is, NPA-NXX.

In accordance with applicants' teachings, a unique LRN, in the form of NPA-NXX, is assigned to each switching entity which terminates subscriber lines. The LRNs are assigned by a code administrator, likely the same administrator responsible for local number administration. Existing end offices which are presently associated with one or more NPA-NXXs, would select one of the NPA-NXXs currently assigned to the office as the LRN. Local service providers establishing new switching entities would, naturally, request and receive an LRN from the administrator. An LRN need not contain the NPA-NXX code of any customer served by the switch identified by the LRN.

To avoid routing complexities it is important that an LRN assigned to any end office not be an NPA-NXX assigned to any other end office. For example, consider a large end office which currently uses four NPA-NXXs to identify customers served from that office. One of the four NPA-NXXs would be selected as the LRN for that office. The LRN for any other end office should not be selected from any of the three (non-LRN) codes assigned to the existing end office. This constraint eliminates the need to establish separate routing tables—or domains—to distinguish routing based upon LRNs—for those dialed numbers that have been ported—from routing based on the dialed number for those numbers that have not been ported. Rather, routing tables as they exist today, would be used to effect call completion. Finally, it is assumed that information associated with LRNs, such as service provider name, common location language identifier (CLLI) code, tandem routes, vertical and horizontal graphics coordinates, etc., would be added to the Local Exchange Routing Guide (LERG).

Equally important in the selection and use of an LRN is its compatibility with the existing signaling methods used to transmit the necessary address information required for proper call completion. Signaling messages are necessary to provide this information either directly to the terminating switch or to an intermediate or tandem office. It will be necessary to carry both the LRN as well as the dialed number (DN) along the signaling path. The LRN is clearly required for call routing and the DN is needed by the serving end office to effect the connection to the loop assigned to the called party. The following describes the methodology through which existing signaling methods can be used to forward this information.

Typically, signaling information is carried over a dedicated, common channel signaling network using the SS7 protocol. Call set-up is effected using an initial address message (IAM) which contains several parameters, each containing specific information related to the call. This signaling method is used to provide call completion in a number portable environment by simply modifying the use of existing parameters. Although the modification of the use of these parameters requires industry agreement, it should not involve the more complex and time consuming exercise of establishing and implementing the use of an entirely new signaling parameter within the SS7 message.

Specifically, the SS7 IAM parameters that are involved are the called party number (CdPN) parameter and the Generic Address Parameter (GAP). Today, for non-featured calls the CdPN parameter is populated with the DN and call routing is performed using this number. (A non-featured call is one who dialed directory number is used for routing the call, in contrast, for example, to 800 calls wherein the dialed number cannot be used directly for routing.) The GAP is an optional parameter designated to transport a "user provided number" and is currently used in only a few instances. It is proposed that when a ported call is processed and an LRN is received as a response from an LNP data base, the LRN is populated in the CdPN parameter of the IAM. It is further proposed that the DN be transmitted in the GAP. The contents of the CdPN parameter (the LRN) will be used as necessary to route the call. Because the information is in the NPA-NXX format, routing should proceed without change. At the terminating end office the 6 digit format of the LRN can be identified by the switch to indicate a call for completion to a ported number. With that identification, the switch can be instructed to locate the number originally dialed —and necessary to identify the called party—in the GAP.

Figure 18:
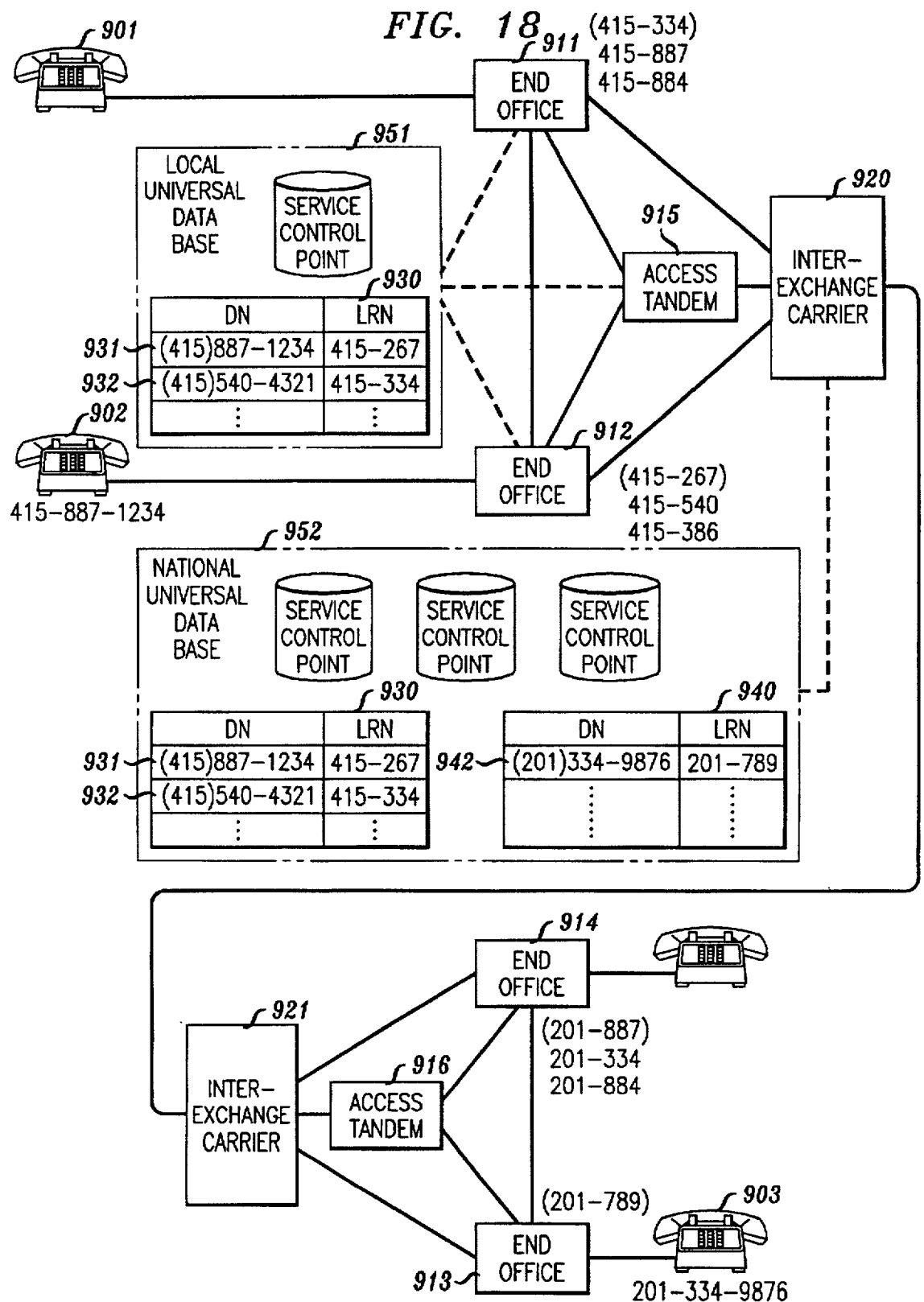

FIG. 18 illustrates the operation of applicant's invention with respect to the use of a location routing number. Telephones 901, 902, and 903 are connected to end offices 911, 912, and 913, respectively. End offices 911, and 912 are in the same local region, whereas, end office 913 is connected to end offices 911, and 912 via trunks interconnecting interexchange carrier offices 920 and 921. Access tandems 915 and 916 are used for accessing the interexchange carrier and for interconnecting the end offices to data bases as shown as local universal data base 951 and a national universal data base 952. For each end office, a set of office codes served by that office is shown. The particular office code which is also used as the location routing number is shown in parentheses.

In the particular example shown, telephone station 415-887-1234 is connected to end office 912 having location routing number 415-267. End office 911 serves the bulk of the telephones having telephone numbers in the 415-887 office code. When telephone 901 calls telephone 902 having telephone number 415-887-1234, a check is made in local universal data base 951, table 930, and an entry 931 is found, indicating that telephone 415-887-1234 is served by an end office identified by location routing number 415-267, i.e., end office 912. If no entry had been found for telephone 415-887-1234, then the call would have been routed using the 415-887 code to end office 911. Entry 932 in table 930 indicates that for called number 415-540-4321, the called number is served by an end office identified by location routing number 415-334.

If telephone 901 calls telephone 903 having telephone number 201-334-9876, such a call is identified as being an inter-LATA (inter-local access transport area) routed to an interexchange carrier which accesses a national universal data base in order to find the identity of the switch serving the terminating telephone. It is necessary to identify this switch in order to route via an exchange carrier that serves the identified switch. The national universal data base 952 has an entry 942 in table 940 for telephone number 201-334-9876 and that entry indicates that the location routing number of the terminating end office is 201-789. If no entry had been found, then the 201-334 office code would have been used to route the call to end office 914 which serves the bulk of the 201-334 office code traffic.

Note that the data bases need only store data for the numbers that are not served by the local switches serving the bulk of the numbers of a particular office code. Data need only be stored for the numbers of customers who have moved from such a switch to another.

Consider the toll call associated with FIG. 18 in more detail.

1. An interLATA call is generated by an end user in California to a called party in New Jersey. The dialed number is (201)334-9876.

2. The call is recognized by the originating end office as an interLATA call and the call is forwarded to the presubscribed interexchange carrier (IC).

3. Although the IC could test to identify the DN at either the originating or terminating switch in its network assume the identification is performed at the originating IC switch. Specifically, the first 6 digits (201-334) of the DN are analyzed and identified as a potentially ported number.

4. Database query is launched to the appropriate NUDB data base with the DN(201) 334-9876.

5. Because the number has been ported, the response from the NUDB data base includes the LRN (201-789).

6. The call is routed based upon the LRN and the originating IC switch formulates an SS7 IAM (initial address message).

7. The CdPN parameter is populated with the LRN (201-789) and the DN (201) 334-9876 is inserted in the GAP.

8. The terminating IC switch routes the call based upon the LRN and generates a signaling message to the designated end office.

9. If the terminating end office is SS7 and "LNP capable" (LNP=Local Number Portability) (i.e. capable of recognizing the modified signaling message):

End office checks contents of CdPN parameter, recognizes the 6 digit format and identifies the call as an "LNP" call.

End office uses the information in the GAP (the DN) to route the call to the appropriate subscriber loop.

10. If the terminating end office is not LNP capable, the (n-1)st switch (i.e., the switch transmitting the signaling message) must format the signaling message so that the DN is contained in the CdPN parameter.

11. Similarly, if the EO is not SS7 compatible, the DN will be forwarded using in-band (MF) signaling.

12. If the dialed number has not been ported, the call is routed and signaling generated in the normal manner.

The dialed number is populated in the CdPN parameter

The GAP is not used

The call is routed based upon the DN contained in the CdPN parameter.

In some cases, an end office switch may serve more than one carrier, with different sets of customers, associated with different sets, telephone numbers, being served by different carriers. Under these circumstances, different trunk groups are likely to be used for the calls of the different carriers. The routing arrangement must be capable of selecting these carriers. Therefore, it is necessary to have the translations in the LUDB951 and NUBD 952 augmented with the identities of the trunk groups or a routing index for finding such trunk groups. As shown in FIG. 14, such carriers must be identified for routing and entered in billing records.

It is to be understood that the above description is only of one preferred embodiment of the invention. Numerous other arrangements may be devised by one skilled in the art without departing from the scope of the invention. The invention is thus limited only as defined in the accompanying claims.

The invention claimed is:

1. In a telecommunications network comprising a switching system and a data base shared by a plurality of switching systems, a method of accessing specialized data for processing a call, said call comprising a telephone number for identifying a party of said call, wherein said specialized data is related to said telephone number, said method comprising the steps of:

in said switching system, storing a first bit map having one bit per telephone number potentially served by said switching system, used for identifying whether said switching system has said specialized data for serving said call;

if said first bit map indicates that said switching system has said specialized data for said telephone number available, using said specialized data available in said switching system; and if said first bit map indicates that said switching system does not have said specialized data available, accessing said data base to obtain said specialized data for said telephone number.

2. The method of claim 1 wherein said specialized data has a default attribute and wherein the step of using said specialized data available in said switching system comprises the step of using said default attribute whereby said first bit map indicates that said switching system has said specialized data whenever said switching system comprises data indicating that said specialized data for said telephone number is said default attribute.

3. The method of claim 2 further comprising the step of:

if said data base is accessed and said specialize data obtained from said data base represents said default attribute, marking said first bit map for said telephone number to indicate that said switching systems has said specialized data for said telephone number available.

4. The method of claim 2 wherein said switching system further comprises a second bit map, having one bit per telephone number potentially served by said switching system, and a table for storing a limited number of entries each representing specialized data for one telephone number, and wherein said second bit map is used to indicate whether the table has an entry for a particular telephone number;

wherein the step of accessing said data base further comprises the steps of:

testing said second bit map to determine whether said table comprises an entry for said specialized data for said telephone number; and accessing said data base only if said second bit map indicates that said table does not contain an entry for said telephone number.

5. The method of claim 1 wherein the step of using said specialized data available in said switching system comprises the step of accessing a table of data in said switching system to find said specialized data for said telephone number.

6. The method of claim 5 further comprising the steps of:

if said data base is accessed to obtain said specialized data for said telephone number, entering said specialized data for said telephone number into said table; and updating said first bit map to indicate that said switching system has said specialized data for said telephone number available.

7. The method of claim 6 wherein the step of entering data into said table comprises the steps of:

removing an entry from said table; and marking said first bit map to indicate that the specialized data, for the telephone number whose entry was removed from said table, is not available in said switching system.

8. The method of claim 1 wherein said switching system comprises a table for storing said specialized data for a limited number of telephone numbers and wherein said first bit map indicates that said switching system has said specialized data for said telephone number available if said specialized data is found in said table or if said specialized data for said telephone number represents a default attribute:

wherein the step of using said specialized data available in said switching system comprises the steps of:

searching said table for specialized data for said telephone number;

if said search finds said specialized data for said telephone number, using said specialized data found in said table; and if said search fails to find said specialized data for said telephone number, using said default attribute as said specialized data for said telephone number.

9. The method of claim 8 further comprising the step of:

if said data base is accessed to obtain said specialized data, marking said first bit map to indicate that said specialized data for said telephone number is available in said switching system; and if said specialized data obtained from said data base does not represent said default attribute, entering said specialized data for said telephone number in said table.

10. The method of claim 9 further comprising the step of:

if said specialized data obtained from said data base does not represent said default attribute, removing an entry from said table to make room for an entry representing the specialized data for said telephone number and marking the bit of said first bit map for the telephone number of the removed entry to indicate that said switching system does not have specialized data for the telephone number whose entry was removed.

11. The method of claims 5 or 8 further comprising the step of:

clearing said table and said first bit map whenever it is found desirable to refresh said table and said first bit map;

whereby said table and said first bit map are automatically populated as calls are made and as said data base is accessed.

12. In a telecommunications network, comprising a switching system and a data base shared by a plurality of switching systems, a method of accessing specialized data for processing a call, said call comprising a telephone number for identifying a party of said call, wherein said specialized data is related to said telephone number, and wherein said specialized data has a plurality of attributes common to a class of service of a large number of telephone numbers, the method comprising steps of:

in said switching system, storing a plurality of bit maps, each bit map, having one bit per telephone number potentially served by said switching system for identifying whether a telephone number has specialized data represented by the common attribute associated with said bit map;

if any one of said bit maps indicates that said telephone number has said specialized data corresponding to one of said common attributes, using the common attribute associated with said any one bit map; and otherwise accessing said data base to obtain said specialized data for said telephone number.

13. The method of claim 12 further comprising the step of:

if the data obtained by accessing said data base represents one of said common attributes, marking the bit map for the one of said common attributes to indicate that said telephone number has associated specialized data corresponding to the one of said common attributes.

14. The method of claim 1, 2, 5, 8 or 12 further comprising the step of:

whenever it is found desirable to refresh the data of a bit map, clearing said bit map;

whereby said bit map is automatically populated as calls are made and said data base is accessed.

15. In a telecommunications network comprising a switching system and a data base shared by a plurality of switching systems, a switching system for processing a call, said call comprising a telephone number for identifying a party of said call, wherein said specialized data is related to said telephone number, said switching system comprising:

memory for storing a first bit map having one bit per telephone number potentially served by said switching system, used for identifying whether said switching system has said specialized data for serving said call; and processor means, operative under program control for executing the steps of:

accessing said first bit map, using said telephone number;

if said first bit map indicates that said switching system has said specialized data for said telephone number available using said specialized data available in said switching system; and if said first bit map indicates that said switching system does not have said specialized data available, accessing said data base to obtain said specialized data for said telephone number.

16. The switching system of claim 15 wherein said specialized data has a default attribute and wherein using said specialized data available in said switching system comprises using said default attribute;

whereby said first bit map indicates that said switching system has said specialized data whenever said first bit map indicates that said specialized data for said telephone number is said default attribute.

17. The switching system of claim 16, wherein said processor means is further operative under program control for executing the step of:

if said data base is accessed, and said specialized data obtained from said data base, represents said default attribute, marking said first bit map for said telephone number to indicate that said switching system has said specialized data for said telephone number available.

18. The switching system of claim 16 wherein said switching system further comprises a second bit map, having one bit per telephone number potentially served by said switching system, and a table for storing a limited number of entries each representing specialized data for one telephone number and wherein said second bit map is used to indicate whether the table has an entry for a particular telephone number;

wherein accessing said data base further comprises the steps of:

testing said second bit map to determine whether said table comprises an entry for said specialized data for said telephone number; and accessing said data base only if said second bit map indicates that said table does not contain an entry for said telephone number.

19. The switching system of claim 15 wherein using said specialized data available in said switching system comprises accessing a table of data in said switching system to find said specialized data for said telephone number.

20. The switching system of claim 19 wherein said processor means is further operative under program control for executing the steps of:

if said data base is accessed to obtain said specialized data for said telephone number, entering said specialized data for said telephone number into said table; and updating said first bit map to indicate that said switching system has said specialized data for said telephone number available.

21. The switching system of claim 20 wherein entering data into said table comprises the steps of:

removing an entry from said table; and marking said first bit map to indicate that the specialized data for the telephone number whose entry was removed from said table, is not available in said switching system.

22. The switching system of claim 15 wherein said memory comprises a table for storing said specialized data for a limited number of telephone numbers and wherein said first bit map indicates that said switching system has said specialized data for said telephone number available if said specialized data is found in said table or if said specialized data for said telephone number represents a default attribute;

wherein using said specialized data available in said switching system comprises the steps of:

searching said table for specialized data for said telephone number;

if said search finds said specialized data for said telephone number, using said specialized data found in said table; and if said search fails to find said specialized data for said telephone number, using said default attribute as said specialized data for said telephone number.

23. The switching system of claim 22 wherein said processor means is further operative under program control for executing the steps of:

if said data base is accessed to obtain said specialized data, marking said first bit map to indicate that said specialized data for said telephone number is available in said switching system; and if said specialized data obtained from said data base does not represent said default attribute, entering said specialized data for said telephone number in said table.

24. The switching system of claim 23 wherein said processor means is further operative under program control for executing the step of:

if said specialized data obtained from said data base does not represent said default attribute, removing an entry from said table to make room for an entry representing the specialized data for said telephone number and marking a bit of said first bit map for the telephone number of the removed entry to indicate that said switching system does not have specialized data for the telephone number whose entry was removed.

25. The switching system of claims 19 or 22 wherein said processor means is further operative under program control of executing the step of:

clearing said table and said first bit map whenever it is found desirable to refresh said table and said first bit map;

whereby said table and said first bit map are automatically populated as calls are made and as said data base is accessed.

26. In a telecommunications network, comprising a switching system and a data base shared by a plurality of switching systems, a switching system for processing a call using specialized data, said call comprising a telephone number of identifying a party of said call, wherein said specialized data is related to said telephone number, and wherein said specialized data has a plurality of attributes common to a class of service of a large number of telephone numbers, said switching system comprising:

memory for storing a plurality of bit maps, each bit map, having one bit per potential telephone number served by said switching system, for identifying whether a telephone number has specialized data represented by the common attribute associated said bit map; and processor means operative under program control for executing the steps of:

accessing said plurality of bit maps, using said telephone number;

if any of said bit maps indicates that said telephone number has said specialized data corresponding to one of said common attributes, using the common attribute associated with said any one bit map; and otherwise accessing said data base to obtain said specialized data for said telephone number.

27. The switching system of claim 26 wherein said processor means is further operative under program control for executing the step of:

if the data obtained by accessing said data base corresponds to one of said common attributes, marking the bit map for the one of said common attributes to indicate that said telephone number has associated specialized data corresponding to the one common attribute.

28. The switching system of claim 15, 16, 17, 19, 22 or 26 wherein said processor means is further operative under program control for executing the step of:

whenever it is found desirable to refresh the data of a bit map, clearing said bit map;

whereby said bit map is automatically populated as calls are made and said data base is accessed.

* * * * *